United States Patent [19]

Beretta et al.

[11] Patent Number: 4,515,888

[45] Date of Patent: May 7, 1985

[54] CYANINE DYES FOR SENSITIZING SILVER HALIDE EMULSIONS TO INFRARED RADIATION AND PHOTOGRAPHIC ELEMENTS INCLUDING THEM

[75] Inventors: Paolo Beretta, Ferrania, Italy; Jonathan P. Kitchin, Ware, England

[73] Assignee: Minnesota Mining and Manufacturing Company, St. Paul, Minn.

[21] Appl. No.: 509,347

[22] Filed: Jun. 30, 1983

[51] Int. Cl.³ ............................................. G03C 1/02
[52] U.S. Cl. .............................. 430/584; 430/576; 430/594; 430/595
[58] Field of Search ............... 430/584, 594, 595, 576

[56] References Cited

U.S. PATENT DOCUMENTS

| | | | |
|---|---|---|---|
| 2,230,257 | 2/1941 | Middleton et al. | 430/583 |
| 2,887,479 | 5/1959 | Haseltine | 430/594 |
| 2,984,664 | 5/1961 | Fry et al. | 430/584 |
| 3,615,632 | 10/1971 | Shiba et al. | 430/594 |
| 3,695,888 | 10/1972 | Hiller et al. | 430/584 |
| 3,936,308 | 2/1976 | Gaugh et al. | 430/587 |
| 4,011,083 | 3/1977 | Durning et al. | 430/584 |

*Primary Examiner*—J. Travis Brown
*Attorney, Agent, or Firm*—Donald M. Sell; James A. Smith; Mark A. Litman

[57] ABSTRACT

Cyanine dyes including two nitrogen containing heterocyclic nuclei, linked to each other through a rigidized conjugated 7, 9 or 11 carbon atom methine chain to form an amidinium-ion resonance system, are very good for sensitizing silver halide emulsions for use in photographic elements to be exposed to infrared radiation if one of said heterocyclic nuclei is 5-methyl-6-methoxy-benzothiazole.

17 Claims, No Drawings

CYANINE DYES FOR SENSITIZING SILVER HALIDE EMULSIONS TO INFRARED RADIATION AND PHOTOGRAPHIC ELEMENTS INCLUDING THEM

FIELD OF INVENTION

The present invention relates to photography and particularly to sensitizing dyes for use with photographic emulsions and elements which are to be sensitized in the infrared region of the electromagnetic spectrum (approximately 700 to 900 nm). Particularly, the present invention relates to dyes useful in sensitizing silver halide emulsions for photographic elements to be exposed to infrared radiation in the region near 800 nm.

BACKGROUND OF THE ART

Dyes for sensitizing gelatin silver halide emulsions to be included in photographic elements for exposure to infrared rays are known in the art. They normally include two heterocyclic nuclei linked to each other by a long conjugated methine chain, having, for example, 7, 9 or 11 carbon atoms. Each of the two heterocyclic nuclei are attached at the ends of such a methine chain, particularly through a carbon atom attached to an alkyl substituted nitrogen atom.

One sensitizing dye of this kind can be described as including a resonance chain of the amidinium ion type, as described in Mees and James, "*The Theory Of The Photographic Process*", third edition, 1966, p. 201. Such a resonance chain or resonance system is made of two nitrogen atoms (alkyl group substituted) at the ends of a conjugated methine chain, one of which is positively charged. Such a conjugated methine chain is partially within the skeleton of said nitrogen-containing heterocyclic nuclei. When speaking in the art, however, about conjugated methine chains between two heterocyclic nuclei, having 7, 9 or 11 carbon atoms, the methine groups of the chain within the heterocyclic nucleus skeleton are not considered in the counting of methine groups (they are normally present as one group, as in benzothiazole and 2-pyridine dyes, or two groups, as in 4-pyridine dyes). The above numbers 7, 9 or 11 thus indicate only the carbon atoms of the conjugated methine chain skeleton which bridges said two heterocyclic nuclei. It is assumed that the point of attachment of the chain to the heterocyclic nucleus is at a carbon atom directly or indirectly attached to the nitrogen atom of the amidinium ion resonance chain, indirectly meaning attached only through a sequence of two conjugated carbon atoms. As known, the nature of the atoms, which form the heterocyclic nucleus, as well as the nature of the substituents attached thereto and the alkyl groups attached to the nitrogen atom itself, and the length and nature of the methine chain between said heterocyclic nuclei have affects on such resonance and on various characteristics of the resulting dyes.

It is known, for example, that heavier heterocyclic nuclei as well as longer chains cause a bathochromic effect on sensitization peaks. It is further known that such long chains may be associated with lack of stability unless they are rigidized by substituting the 2nd through 4th or 3rd through 5th methine groups in with carbon atoms respectively to form a 6- or 5-membered carbon ring. Reference can be made to U.S. Pat. No. 2,734,900 describing chains rigidized on a 6-membered ring and to U.S. Pat. Nos. 3,482,978 and 3,758,461 and GB Pat. No. 1,188,784 describing chains rigidized on a five-membered ring.

Such heterocyclic nuclei linked together through said methine chain may be chosen among those 5-, 6- or 7-membered heterocyclics comprised of C, N, S, O and Se ring atoms which may also have fused on benzene or naphthalene rings known in the art such as, for example, thiazole, benzothiazole, [1,2-d]-naphthothiazole, [2,1-d]-naphthothiazole, oxazole, benzoxazole, selenazole, benzoselenazoline, [1,2-d]-naphthoselenazole, [2,1-d]-naphthoselenazole, thiazoline, oxazoline, selenazoline, 2-quinoline, 2-pyridine, 3,3-dialkyl-indolenine, 4-quinoline, 4-pyridine, imidazole and benzimidazole. Various substituents can be attached to each of them in their various reactive positions as known in the art. Such substituents and their position can be chosen to introduce desired variations into the characteristics of the dyes and their sensitization properties, such as stability, solubility and sensitization peak. In spite of the many experiments made in the art, however, the capability of such dyes to sensitize the silver halide emulsions to the infrared rays still remains unsatisfactory.

SUMMARY OF THE INVENTION

Cyanine dyes including two heterocyclic nuclei linked to each other by a rigidized methine chain, having 7, 9 or 11 carbon atoms, are very good for sensitizing silver halide emulsions included in photographic elements for exposure to infrared radiation, if one of said heterocyclic nuclei is 5-methyl-6-methoxy-benzothiazole.

DETAILED DESCRIPTION OF THE INVENTION

Efforts to obtain dyes for infrared sensitizing of photographic silver halide gelatin emulsions and improving the sensitivity of emulsions, as well as an improved sensitivity to fog ratio, to manufacture photographic elements for exposure to infrared radiation have led to the preparation of new dyes which showed unexpected good properties when sensitizing silver halide emulsions. Such dyes are a novel subclass of the general type known in the art which includes two heterocyclic nuclei linked to each other by a conjugated methine chain to form what is called an amidinium-ion resonance system.

Such dyes are particularly good according to the present invention if they include a benzothiazole nucleus having both a 5-methyl and 6-methoxy substituent attached thereto. It has been found, in fact, that the combination of a long rigidized chain with a 5-methyl-6-methoxy-benzothiazole nucleus (with or without additional substitution) provides stable dyes having a high sensitizing power in the infrared region of the electromagnetic spectrum for silver halide emulsion grains associated therewith. It has been also found that photographic elements including such emulsion grains associated with the dyes of the present invention, dispersed in a gelatin layer, give very good results concerning sensitivity to fog ratio when exposed and conventionally processed.

The present invention thus refers to cyanine dyes including two nitrogen-containing heterocyclic nuclei linked to each other through a rigidized conjugated methine chain to form an amidinium-ion resonance system characterized by the fact that such chain has 7, 9 or 11 carbon atoms and at least one of said nuclei is a 5-methyl-6-methoxy-benzothiazole nucleus.

The present invention particularly refers to dyes including such 5-methyl-6-methoxy-benzothiazole nucleus combined with another heterocyclic nucleus chosen within those of the thiazole series, benzothiazole series, [1,2-d]-naphthothiazole series, [2,1-d]-naphthothiazole series, oxazole series, benzoxazole series, selenazole series, benzoselenazole series, [1,2-d]-naphthoselenazole series, [2,1-d]-naphthoselenazole series, thiazoline series, oxazoline series, selenazoline series, 2-quinoline series, 4-quinoline series, 2-pyridine series, 4-pyridine series, 3,3-dialkyl-indolenine series (wherein alkyl has a meaning known to those skilled in the art including alkyl groups having 1 to 12 carbon atoms), imidazole series and benzimidazole series.

More particularly and preferably, the present invention refers to dyes of the type above indicated in which both heterocyclic nuclei are of the benzothiazole series. Still particularly, the present invention refers to the dyes above in which the rigidized methine chain has 7 carbon atoms. Most preferably, the present invention refers to sensitizing dyes as described above in which one heterocyclic nucleus is a 5-methyl-6-methoxy-benzothiazole and the other is unsubstituted benzothiazole. Particularly, the present invention refers to the above dyes in which part of said rigidized chain is included in a rigidizing nucleus structure made of 5 or 6 carbon atoms. More preferably, said chain rigidizing nucleus is a cyclohexene nucleus (substituted or not). Still more preferably, said chain rigidizing nucleus is an exocyclic nitrogen substituted cyclopentene nucleus, wherein said nitrogen bears two substituents attached thereto which may form a further ring attached to said pentene nucleus, as hereinafter illustrated by structural formulae and by a more detailed description.

The present invention refers to photographic emulsions including gelatin and silver halide grains dispersed therein, characterized by having said grains associated with the above sensitizing dyes to make them sensitive to infrared radiation.

The present invention also refers to photographic elements for exposure with infrared radiation sources, especially those of about 800 nm, including a support base and a gelatin emulsion layer containing silver halide grains in sensitizing association with the above dyes.

Most of the dyes of the present invention can be usefully described by making reference to the following structural formulae:

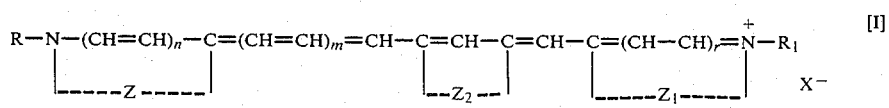
[I]

wherein:

R and $R_1$ can be a substituted alkyl group or a non-substituted alkyl having from 1 to 8 carbon atoms such as, for example, methyl, ethyl, propyl, butyl, amyl, benzyl, octyl, carboxy-methyl, carboxyethyl, sulfopropyl, carboxypropyl, carboxy-butyl, sulfoethyl, sulfoisopropyl and sulfobutyl groups; $X^-$ is any acid anion such as, for example, chloride, bromide, iodide, perchlorate, sulfamate, thiocyanate, p-toluenesulfonate and benzensulfonate;

Z and $Z_1$ are independently the non-metallic atoms necessary to complete an aromatic heterocyclic nucleus chosen within the group of those known in the art to make sensitizing dyes including an amidinium-ion resonance system, as already indicated, particularly those of the described series including proper substituents attached thereto as known in the art with the proviso that at least one of the formed nuclei is a 5-methyl-6-methoxy-benzothiazole nucleus;

$Z_2$ are the atoms necessary to complete a six-carbon nucleus, particularly a nucleus of the following type:

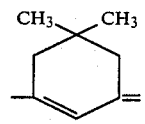

(as understood, such $Z_2$ nucleus has to include conjugated methine groups within the dye resonance methine chain with the exclusion of groups or bonds which can interfere with such chain, for example by substracting electrons);

m is 1, 2 or 3 and n or r are each 0 or 1; and

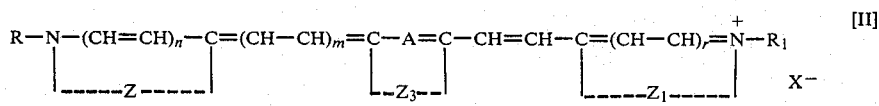
[II]

wherein:

R, $R_1$, m, n, r, Z and $Z_1$ have the same meaning as before;

A is a carbon atoms substituted with a disubstituted N atom,

such substituents ($R_2$ and $R_3$) each preferably being a substituted alkyl group or non-substituted alkyl having from 1 to 12 carbon atoms such as methyl, ethyl, propyl, isopropyl, butyl, hexyl, octyl, dodecyl; and alkoxycarbamyl alkyl group including no more than 12 carbon atoms such as methoxycarbamylmethyl, ethoxycarbamylethyl; an aryl group such as substituted phenyl group and non-substituted phenyl as, for example, m- or p-tolyl, m- or p-chlorophenyl, m- or p-alkoxyphenyl, wherein the alkoxy group contains 1 to 4 carbon atoms such as m-propoxyphenyl, m-butoxyphenyl, p-methoxyphenyl, p-ethoxyphenyl, p-propoxyphenyl, p-butoxyphenyl. Such N-substituents, taken together, may be the non-metallic atoms necessary to complete a 5- or 6-membered heterocyclic nucleus such as pyrrolidyl, piperidyl, morpholylgroups or N-substituted piperazinyl groups, the nitrogen atom thereof being preferably substituted with a substituted alkly group or non-substituted alkyl as described before for $R_2$ and $R_3$ substituents; and $Z_3$ means the carbon atoms necessary to form a 5-carbon rigidized nucleus each of them having attached $R_4$ and $R_5$ groups each representing hydrogen, alkyl groups having 1 to 4 carbon atoms such as methyl, ethyl, ethylethoxy, propyl, isopropyl and butyl, halogen such as chlorine or bromine, alkoxy groups having from 1 to 4 carbon atoms such as methoxy, ethoxy, propoxy, isopropoxy and butoxy groups. The preferred 5-carbon rigidized nucleus of formula [II] including both A and $Z_3$, as described, can be represented by the following formula:

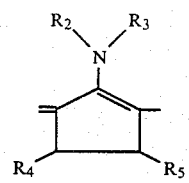

[III]

wherein the respective meanings of $R_2$, $R_3$, $R_4$ and $R_5$ have been given above.

It is to be noted that with dyes of structure formula [I], the Z nucleus is not equivalent, or symmetrical, with respect to the $Z_1$ nucleus, $Z_1$ is linked to $Z_2$ by only one methine group, included therebetween, while there are at least 3 methine groups between Z and $Z_2$. Preferred compounds within this invention have $Z_1$ equal to 5-methyl-6-methoxy-benzothiazole, as described hereinabove.

With reference to the substituents present in Z and $Z_1$ nuclei, they are well known to those skilled in the art both in general and with particular reference to the considered nucleus series. They are to be chosen as to introduce desired characteristics to the molecule, as known in the art, to meet particular objectives of interest. The above, of course, is true also for the various substituents of the dye molecule and for the choice of the heterocyclic Z, $Z_1$, $Z_2$ and $Z_3$ nucleus configuration, the choice of Z and $Z_1$ (which we will call "resonant" heterocyclic nuclei to distinguish them from other heterocyclic nuclei present in the dye molecule) being particularly important in determining the sensitizing region of the dyes themselves. The present invention will be particularly described with reference to individual problems. The first desired photographic element, for example, was to be a conventional black and white silver halide photographic element for exposure to infrared radiation (at about 800 nm) and processible, after exposure, in conventional black and white developer and fixer baths. In elements of this type, it is not absolutely required that the dyes are completely washed away from the element during processing. Accordingly, there were no reasons to manufacture dyes having R and $R_1$ including solubilizing groups such as carboxy and sulfoxy groups. It is not excluded, however, that other photographic elements might require such water solubility. That is the normal case in color photographic elements where said silver halide emulsion grains dispersed in gelatin are associated with color forming couplers to form dyes upon color development with p-phenylene diamine developers (as well known in the art).

To complete the above description of heterocyclic groups, however, a list of exemplary substituted nuclei is given below for each of the series of heterocyclic nuclei to be combined with a 5-methyl-6-methoxy-benzothiazole compound to obtain dyes of the present invention:

(a) Thiazole series, such as, for instance, 4-methyl-thiazole, 5-methyl-thiazole, 5-phenyl-thiazole, 4,5-dimethyl-thiazole, 4,5-diphenyl-thiazole.

(b) Benzothiazole series, such as, for instance, 4-halogen-benzothiazole (i.e., 4-bromo, 4-chloro, 4-iodo-benzothiazole), 5-halogen-benzothiazole (i.e., 5-chloro, 5-bromo, 5-iodo-benzothiazole), 6-halogen-benzothiazole (i.e., 6-chloro, 6-bromo, 6-iodo-benzothiazole), 7-halogen-benzothiazole (i.e., 7-chloro, 7-bromo, 7-iodo-benzothiazole) 4-methyl-benzothiazole, 5-methyl-benzothiazole, 6-methyl-benzothiazole, 7-methyl-benzothiazole, 4-phenyl-benzothiazole 5-phenyl-benzothiazole, 6-phenyl-benzothiazole, 4-methoxy-benzothiazole, 5-methoxy-benzothiazole, 6-methoxy-benzothiazole, 4-ethoxy-benzothiazole, 5-ethoxy-benzothiazole, 5,6-hydroxymethylene-benzothiazole, 5-hydroxy-benzothiazole, 6-hydroxy-benzothiazole, 5,6-dimethyl-benzothiazole, 5,6-dimethoxy-benzothiazole, 4-carboxy-benzothiazole, 5-carboxy-benzothiazole, 6-carboxy-benzothiazole.

(c) [1,2-d]-naphthothiazole and [2,1-d]-naphthothiazole series, such as, for instance, 5-methoxy-[1,2-d]-naphthothiazole, 5-ethoxy-[1,2-d]-naphthothiazole, 8-methoxy-[2,1-d]-naphthothiazole, 7-methoxy-[2,1-d]-naphthothiazole.

(d) Oxazole series, such as, for instance, 4-methyl-oxazole, 5-methyl-oxazole, 4-phenyl-oxazole, 5-phenyl-oxazole, 4,5-diphenyl-oxazole, 4-ethyl-oxazole, 4,5-dimethyl-oxazole.

(e) Benzoxazole series, such as, for instance, 5-halogen-benzoxazole (i.e., 5-chloro, 5-bromo, 5-iodo-benzoxazole), 5-methyl-benzoxazole, 6-methyl-benzoxazole, 5,6-dimethyl-benzoxazole, 5-phenyl-benzoxazole, 5-methoxy-benzoxazole, 6-hydroxy-benzoxazole.

(f) Selenazole series, such as, for instance, 4-methyl-selenazole, 4-phenyl-selenazole.

(g) Benzoselenazole series, such as, for instance, 5-halogen-benzoselenazole (i.e., 5-chloro, 5-bromo, 5-iodo-benzoselenazole), 5-methoxy-benzoselenazole, 5-methyl-benzoselenazole, 5,6-dimethyl-benzoselenazole, 5,6-dimethoxy-benzoselenazole.

(h) [1,2-d]-naphthoselenazole and [2,1-d]-naphthoselenazole series.

(i) Thiazole series, such as, for instance, 4-methyl-thiazoline, 4-hydroxy-methyl-thiazoline, 4,4-bis-hydroxymethyl-thiazoline, 4-acetoxy-4-methyl-thiazoline, 4,4-bis-acetoxy-methyl-thiazoline.

(j) Oxazoline series, such as, for instance, 4-hydroxymethyl-4-methyl-oxazoline, 4,4-bis-acetoxy-methyl-oxazoline.

(k) Selenazoline series.

(l) 2-quinoline series, such as, for instance, 3-methyl-2-quinoline, 5-methyl-2-quinoline, 6-methyl-2-quinoline, 5,6-dimethyl-2-quinoline, 5-ethyl-2-quinoline, 6-methoxy-2-quinoline, 6,7-dimethyl-2-quinoline, 6-halogen-2-quinoline (i.e., 6-chloro, 6-bromo, 6-iodo-2-quinoline), 8-halogen-2-quinoline (i.e., 8-chloro, 8-bromo, 8-iodo-2-quinoline), 8-ethoxy-2-quinoline.

(m) 4-quinoline series, such as, for instance, 6-methyl-4-quinoline, 7-methyl-4-quinoline, 6,7-dimethyl-4-quinoline, 6-halogen-4-quinoline (i.e., 6-chloro, 6-bromo, 6-iodo-4-quinoline), 7-methyl-4-quinoline, 8-halogen-4-quinoline (i.e., 8-chloro-, 8-bromo-, 8-iodo-4-quinoline).

(n) 2-pyridine series, such as, for instance, 5-methyl-2-pyridine.

(o) 4-pyridine series, such as, for instance, 3-methyl-4-pyridine.

(p) 3,3-dialkyl-indolenine series (wherein alkyl has 1 to 12 carbon atoms), such as, for instance, 3,3-dimethyl-indolenine, and 3,3,5- or 3,3,7-trimethylindolenine.

(q) Imidazole series, such as, for instance, 1-alkyl-imidazole, 1-alkyl-4-phenyl-imidazole, 1-alkyl-4,5-dimethyl-imidazole.

(r) Benzimidazole series, such as, for instance, 1-alkyl-benzimidazole, 1-alkyl-5,6-dihalogen-benzimidazole, 1-alkyl-5,6-dichloro-benzimidazole, 1-alkyl-5,6-dibromo-benzimidazole, 1-alkyl-5,6-diiodo-benzimidazole, 1-alkyl-5-chloro-6-bromo-benzimidazole, 1-phenyl-benzimidazole, 1-alkyl-5-halogen-benzimidazole, 1-alkyl-5-chloro-benzimidazole, 1-alkyl-5-bromo-benzimidazole, 1-alkyl-5-iodo-benzimidazole, 1-hydroxy-alkyl-5,6-dihalogen-benzimidazole (5,6-dichloro-, 5,6-dibromo-, 5,6-diiodo-benzimidazole), 1-acetoxy-ethyl-5,6-dihalogen-benzimidazole (5,6-dichloro-, 5,6-dibromo-. 5,6-diiodo-benzimidazole), 1-ethyl-5-halogen-6-amino-benzimidazole (5-chloro-, 5-bromo-, 5-iodo-6-amino-benzimidazole), 1-ethyl-5-acetyl-benzimidazole, 1-alkyl-6-trifluoro-methyl-benzimidazole.

The dyes corresponding to the general formula [I] can be prepared by condensing a compound represented by the general formula:

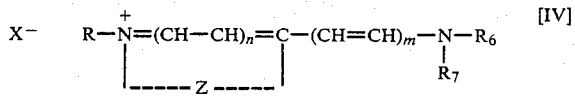

wherein:
R, Z, n, m and $X^-$ have the hereinbefore reported meanings;
$R_6$ represents an aryl group, such as phenyl and o-, m-, or p-tolyl;
$R_7$ represents an acyl group, such as acetyl, propionyl, benzoyl with a compound chosen among those of formula:

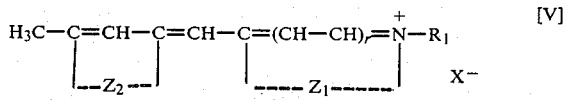

wherein:
$Z_2$, $Z_1$, r, $R_1$ and $X^-$ have the hereinbefore described meanings.

The compounds of formula [V] can be prepared according to U.S. Pat. Nos. 2,734,900 and 2,887,479. The dyes corresponding to the general formula [II], wherein Z is equal to $Z_1$ and m is 1, can be prepared by condensing a compound of general formula:

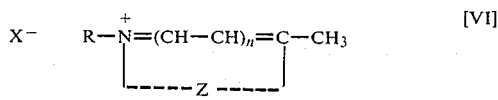

with a compound selected from among the following formulae:

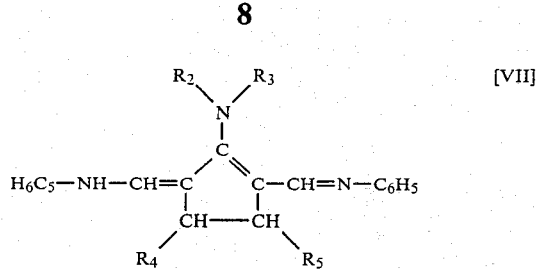

or

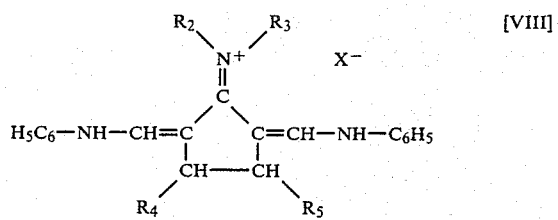

wherein:
$X^-$, R, Z, n, $R_2$, $R_3$, $R_4$ and $R_5$ have the above described meanings;
and the dyes corresponding to general formula [II], wherein m is 2 or 3, can be prepared by condensing a compound of general formula:

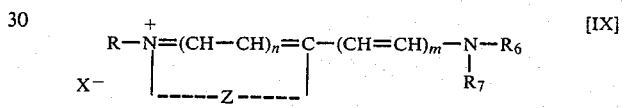

with a compound having the formula:

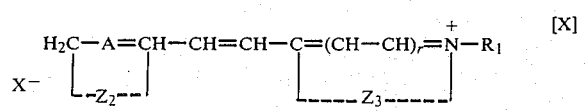

wherein:
X, R, Z, n, $R_6$, $R_7$, A, $Z_3$, $A_2$, r and $R_1$ have the above described meanings.

The cyanine dyes of the present invention are useful in the spectral sensitization of photographic silver halide emulsions to the infrared region of the electromagnetic spectrum. Silver halide emulsions spectrally sensitized with the cyanine dyes of the present invention can comprise any photosensitive silver halide including silver chloride, silver bromide, silver bromo-iodide, silver chloro-bromo-iodide and mixtures thereof. Such emulsions can be coarse, medium or fine grain and can be prepared by any of the well-known procedures as described in Research Disclosure 17643, December 1978, par. I.

The silver halide emulsions spectrally sensitized with the dyes of this invention can be unwashed or washed as described in Research Disclosure 17643, December 1978, par. II.

The silver halide emulsions containing sensitizing dyes in accordance with this invention can be chemically sensitized as described in Research Disclosure 17643, December 1978, par. III.

Additionally, the cyanine dyes of this invention can be employed in combination with other spectral sensitizing dyes. Other sensitizing dyes which may be used in combination with the present dyes are described, for example, in Research Disclosure 17643, December 1978, par. IV.

Silver halide emulsions containing the sensitizing dyes of this invention can be protected against the production of fog and can be stabilized against loss of sensitivity curing keeping. Suitable antifoggants and stabilizers are described, for example, in Research Disclosure 17643, December 1978, par. VI.

Photographic elements comprising silver halide emulsions containing sensitizing dyes of this invention can employ optical brightening agents as described, for example, in Research Disclosure 17643, December 1978, par. V.

Photographic emulsions of this invention can be used in elements designed for color photography containing color-forming couplers as described, for example, in Research Disclosure 17643, December 1978, par. VII.

The spectrally sensitized silver halide emulsions of this invention can contain speed increasing compounds such as those described, for example, in Research Disclosure 17643, December 1978, par. XXI.

Photographic elements including emulsions spectrally sensitized in accordance with this invention can contain incorporated developing agents as described, for example, in Research Disclosure 17643, December 1978, par. XX.

The layers of said photographic elements can contain various colloids as vehicles or binding agents as described, for example, in Research Disclosure 17643, December 1978, par. IX.

Said colloids can be hardened by various organic and inorganic hardeners such as those described, for example, in Research Disclosure 17643, December 1978, par. X.

Emulsions spectrally sensitized in accordance with this invention can be used in photographic elements which contain antistatic or conducting layers, plasticizers and lubricants, surfactants, matting agents, light-absorbing materials and filter dyes as described, for example, in Research Disclosure 17643, December 1978, par. XI, XII, XIII and XVI.

Photographic emulsions containing the sensitizing dyes of the invention can be coated on a wide variety of supports as described, for example, in Research Disclosure 17643, December 1978, par. XVII.

The sensitizing dyes and other emulsion addenda can be incorporated into the layers of the photographic elements with various methods as described, for example, in Research Disclosure 17643, December 1978, par. XIV.

Photographic emulsions of this invention can be coated on photographic supports by various procedures. Supports and coating procedures are described, for example, in Research Disclosure 17643, December 1978, par. XV and XVII.

The sensitized silver halide emulsions of this invention can be processed after exposure to form a visible silver and/or dye image by associating the silver halide with an aqueous alkaline medium in the presence of a developing agent as described, for example, in Research Disclosure 17643, December 1978, par. XIX.

The sensitized silver halide emulsions of this invention can be useful in physical development systems, image transfer systems, dry development systems printing and lithography, print-out and direct-print systems as described, for example, in Research Disclosure 17643, December 1978, par. XXII, XXIII, XXIV, XXV, XXVI and XXVII.

Features of the present invention will be more particularly described in the following Examples.

EXAMPLE 1

2,5-dimethyl-6-methoxy-benzothiazole

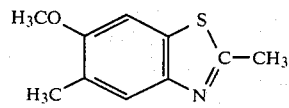

120 g of 2-methyl-4-thioacetamino-anisole were dissolved in 80 ml of dioxane, 1 l. of water and 600 ml of 6N NaOH. After decantation of the liquid phase, the residue was redissolved with a mixture of 300 ml of water and 50 ml of 6N NaOH. The two solutions containing pure 2-methyl-4-thioacetamino-anisole were cleaned by addition of animal charcoal and stirring. A water solution of $K_3Fe(CN)_6$ was then added dropwise to the filtrate under stirring. After such addition, the solution, thus obtained, was stirred for 2 hours at room temperature. The reaction mixture was then poured into a Rutscher-Stendall liquid-liquid type extractor and the base was extracted with ether. The ethereal solution, thus obtained, after having been dried an anhydrous $Na_2So_4$, was concentrated and the residual oil was finally distilled under vacuum collecting the 158° C./3 mm. Hg fraction. Yield: 65 g. The product thus obtained was purified upon crystallization from ligroin in the presence of animal charcoal, thus obtaining a pure product melting at 89°–90° C.

| Percent analysis: | Calculated | Found |
| --- | --- | --- |
| C % | 62.16 | 62.21 |
| H % | 5.73 | 5.95 |
| N % | 7.25 | 7.03 |

EXAMPLE 2

2-methyl-4-thioacetamino-anisole

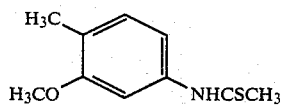

185 g of 2-methyl-4-acetamino-anisole (prepared by procedures described by M. Heidelberg and W. A. Jacobs in J.A.C.S. 41 (1919) p. 1453), 100 ml of pyridine and 250 ml of anhydrous dioxane were poured into a 1 l. multi-neck flask mounted on an oil bath whose temperature was 100° C. After complete dissolution, 130 g of $P_2S_5$ were added thereto in small portions under stirring; after the addition, the solution thus obtained was stirred for another 45 minutes by maintaining the conditions of the reaction temperature. The reaction mixture was poured into a 5 l. of a very cold water solution of 45 g of NaOH; animal charcoal was added thereto and the whole stirred for 1 hour. After filtration, the solution was poured into a Keller flask, provided with a stirrer and externally cooled, cautiously acidified with concentrated HCl to pH=4–5, keeping the temperature lower than +5° C. After approximately 1 hour of stirring, the product, thus separated, was filtered with a Buchner and washed with water. The raw product was crystallized many times from ligroin in the presence of animal charcoal to reach a melting point of 88.5°–89° C.

| Percent analysis: | Calculated | Found |
|---|---|---|
| C % | 61.505 | 61.51 |
| H % | 6.71 | 6.76 |
| N % | 7.17 | 7.15 |

EXAMPLE 3

3-ethyl-2,5-dimethyl-6-methoxy-benzothiazole iodide

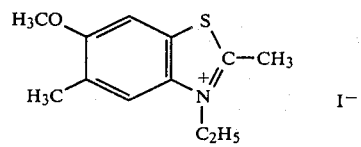

6 g of 2,5-dimethyl-6-methoxy-benzothiazole and 60 ml of ethyl iodide were reacted in a pressure flask heated to 100° C. on an oil bath for 3 days. After cooling, the raw product was washed by grinding with ether and acetone and dried in a desicator. It was then crystallized from ethanol, thus obtaining 54 g of a crystalline product melting at 249°–252° C.

EXAMPLE 4

2-(ω-acetanilido-vinyl)-3-ethyl-5-methyl-6-methoxy-benzothiazole ethyl-p-toluene-sulfonate

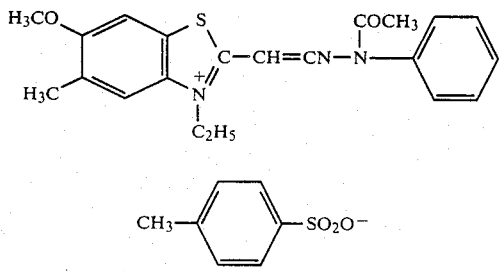

20 g of 2,5-dimethyl-6-methoxy-benzothiazole and 25 g of ethyl-p-toluene-sulfonate were reacted at 150° C. for 2 hours. The salt, thus obtained, was purified by dissolution in ethanol and precipitation with ethyl ether and then reacted with 30 g of diphenylformamidine in 400 ml of kerosene at 125°–130° C. for 2 and one half hours. The solvent was decanted and the residue, thus obtained, was boiled with 120 ml of acetic anhydride for half an hour. The product thus obtained was left to stand for one night at room temperature. After filtration and after washing with ether, 26 g of a product melting at 265°–266° C. was obtained.

EXAMPLE 5

3,3'-diethyl-5-methyl-6-methoxy-9',11'-neopentylene-thia-tricarbocyanine iodide

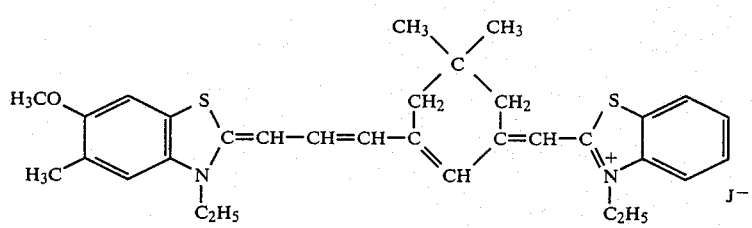

0.98 g of 2-(ω-acetanilido-vinyl)-5-methyl-6-methoxy-benzothiazole ethyliodide and 1 g of 3-ethyl-2-(1,5,5-trimethyl-3-cyclohexenylidene)-methyl-benzothiazole iodide (prepared as described in U.S. Pat. No. 2,887,479) were dissolved, by heating in 10 ml of pyridine and 0.7 ml of triethylamine were added thereto. The solution was refluxed for 15 minutes and then poured into water. It was left to stand for 2 hours and the dye was then collected on a Buchner, washed with water and then with an acetone ethyl-ether mixture in a ratio of 1:2. The dye was then crystallized from ethyl ether.

M.P. = 188°–191° C. $\lambda_{max}$ = 792 nm (methanol).

EXAMPLE 6

3,3'-diethyl-5,5'-dimethyl-6,6'-dimethoxy-9',11'-neopentylene-thia-tricarbocyanine iodide

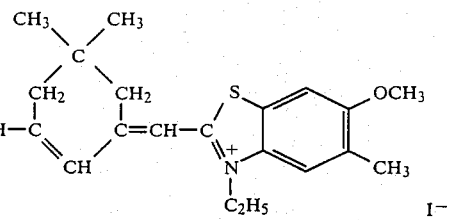

1.8 g of 2-(ω-acetanilido-vinyl)-5-methyl-6-methoxy-3-ethyl-benzothiazole p-toluene-sulfonate and 1.6 g of 3-ethyl-5-methyl-6-methoxy-2-(1,5,6-trimethyl-3-cyclohexenylidene)-methyl-benzothiazole iodide were dissolved in 15 ml of acetic anhydride and 1.5 ml of triethylamine, by heating to reflux. The solution was refluxed for 4 minutes and then cooled overnight. The dye was collected on a Buchner, washed with ethanol and ethyl ether and dried. 1.54 g of pure dye were obtained having M.P. = 170°–175° C.

$\lambda_{max}$ = 790 nm (methanol).

EXAMPLE 7

3,3'-diethyl-5'-methyl-6'-methoxy-9',11'-neopentylene-thia-tricarbocyanine iodide

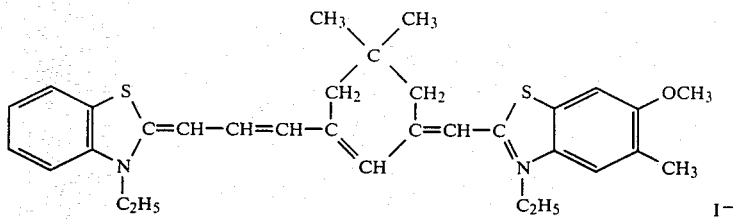

1.5 g of 2-(ω-acetanilido-vinyl)-3-ethyl-benzothiazole iodide and 1.6 g of 3-ethyl-5-methyl-6-methoxy-2-(1,5,5-trimethyl-3-cyclohexenylidene)-methyl-benzothiazole iodide were dissolved in 15 ml of acetic anhydride and 1.5 ml of triethylamine, by heating to reflux. The solution was refluxed 4 minutes and then cooled. 15 ml of ethyl ether were added to the solution and the dye, which separated on further cooling, was collected on a Buchner, washed with ethanol and ethyl ether and dried. 1.50 g of pure dye was obtained. M.P.=251°-254° C. $\lambda_{max}$=768 nm(methanol).

EXAMPLE 8

3,3'-diethyl-5,5'-dimethyl-6,6'-dimethoxy-10,12-ethylene-11-N-methyl-anilino-thiatricarbocyanine perchlorate

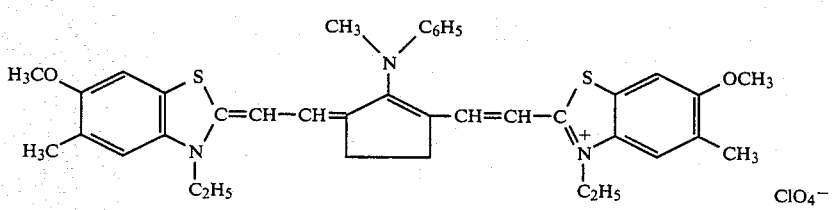

2.39 g of 3 anilinomethylene-2-(N-methylanilino)-1-phenylimino-methyl-cyclopentylidene perchlorate and 3.93 g of 2,5-dimethyl-6-methoxy-3-ethyl-benzothiazole p-toluenesulfonate were dissolved in a mixture formed by 25 ml of dimethylformamide, 3,5 ml of triethylamine and 0.7 ml of acetic anhydride. The solution was left at room temperature for 18 hours. The dye was filtered on a Buchner funnel and extracted repeatedly with 75 ml of hot water. The dye was washed again on the Buchner with hot water and purified by recrystallization from 250 ml of acetonitrile 0.4 g of pure dye were obtained. $\lambda_{max}$=833 nm (methanol). M.P.=259°-261° C.

EXAMPLE 9

3,3'-diethyl-5,5'-dimethyl-6,6'-dimethoxy-10,12-ethylene-11-diphenylamino-thiatricarbocyanine perchlorate

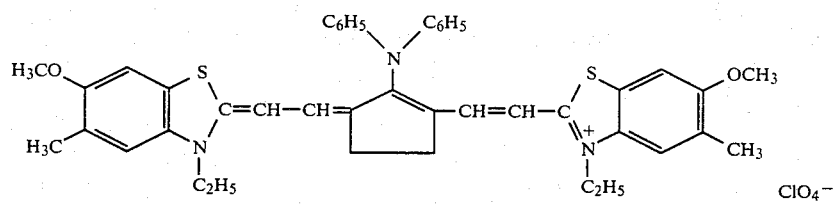

1.36 g of 3-anilino-methylene-2-diphenylamino-1-phenyliminomethyl-cyclopentylidene perchlorate and 1.96 g of 2,5-di-methyl-6-methoxy-3-ethyl-benzothiazole iodide were dissolved in a mixture formed from 25 ml of methanol, 2.5 ml of triethylamine and 0.8 ml of acetic anhydride. The solution was refluxed for 7 minutes. Upon cooling, the dye was filtered and extracted with 75 ml of hot methanol. The raw dye was purified by recrystallization from a mixture formed from 60 ml of dimethyl-formamide, 60 ml of methanol and 0.6 ml of acetic acid. The pure dye was filtered on a Buchner, washed with methanol and ethyl ether and dried. $\nu_{max}$=832 nm (methanol). M.P. >340° C.

EXAMPLE 10

3,3'-diethyl-9',11'-neopentylene-5-methyl-6-methoxy-4',5'-benzo-thia-tricarbocyanine iodide

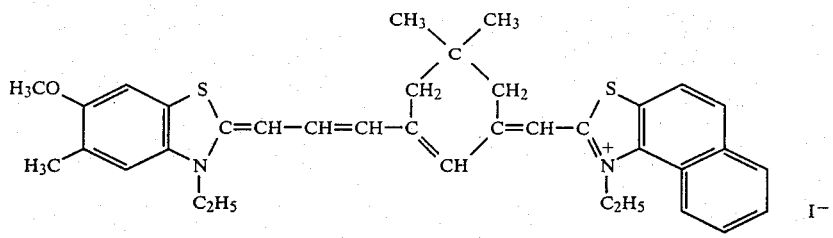

2.5 g of 2-(ω-acetanilido-vinyl)-3-ethyl-5-methyl-6-methoxy-benzothiazole p-toluene-sulfonate and 2.37 g of 3-ethyl-2-(1,5,5-trimethyl-3-cyclohexenylidene)-methylnaphtho-[1,2-d]-thiazole iodide were dissolved in a mixture formed from 15 ml of pyridine, 1.5 ml of triethylamine and 1.5 ml of acetic anhydride. The mixture was refluxed for 10 minutes and then cooled. The dye was collected on a Buchner funnel and washed with ethyl ether. The raw dye was purified by recrystallization from a mixture formed by 100 ml of dimethylformamide and 200 ml of ethanol. 1.0 g of pure dye was obtained. $\lambda_{max}=798$ nm (methanol). M.P.=280° C./dec.

EXAMPLE 11

3,3'-diethyl-5-methyl-6-methoxythia-tricarbocyanine iodide

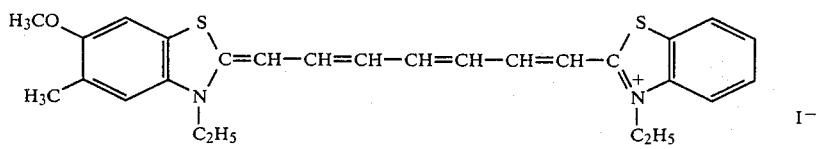

5.02 g of 2-(ω-acetanilido-vinyl)-3-ethyl-benzothiazole iodide and 3.49 g of 2,5-dimethyl-6-methoxy-3-ethyl-benzothiozole iodide were dissolved in a mixture formed from 15 ml of dimethylformamide, 4 ml of acetic anhydride and 4 ml of triethylaniline and heated to reflux for 5 minutes. After cooling, the reaction solution was poured into ethyl ether; the gum obtained was hot-treated repeatedly with water. The raw dye was purified by crystallization from a mixture (1:1) of ethanol and methanol. 0.34 g of pure dye were obtained having $\lambda_{max}=766$ nm (methanol). M.P.=170°-173° C./dec.

EXAMPLE 12

3,3'-diethyl-9,11-neopentylene-thia-tricarbocyanine iodide

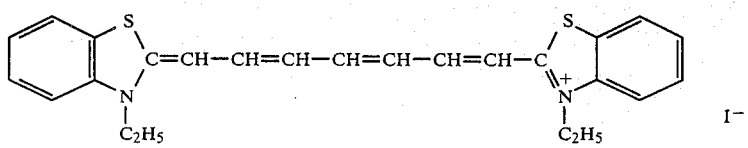

This dye was prepared according to U.S. Pat. No. 2,734,900 (see Example 12 thereof). M.P.=178°/181° C.

EXAMPLE 13

3,3'-diethyl-thia-tricarbocyanine iodide

This dye, commercially available, can be prepared with methods known to the skilled in the art.

M.P.=222°-224° C./dec.

EXAMPLE 14

The dyes of Examples 11, 12, 13 and 7 were separately incorporated in the same emulsion containing 64% silver chloride moles and 36% silver bromide moles with cubic grains having 0.25μ as the mean grain size and a narrow distribution curve, and which was conventionally sulphur sensitized. Dyes were incorporated at a quantity of 0.16 g of dye per mole of silver. After a short digestion period, the emulsions were coated on a cellulose triacetate base, dried and exposed in a sensitometer using a BRAUN F-900 Xenon flash (1 millisecond as exposure time) through a narrow-cut interference filter having a transmission peak at 820 nm with a band width of 10 nm at a half peak transmission. After exposure, the strips were conventionally processed in 3M XP 507 X-ray Processor using commercial developing and fixing baths (3M XAD 90-M Liquid Developer and 3M XAF 2 Liquid Fixer). Table 1 shows the sensitometric data expressed in Log It (Relative Sensitivity) measured at d=1.0 above fog level.

TABLE 1

| Dyes | Quantity (mg/mole Ag) | Fog | Relative sensitivity (Log It) |
|---|---|---|---|
| 11 | 160 | 0.14 | 1.00 |
| 12 | 160 | 0.14 | 1.07 |
| 13 | 160 | 0.25 | 1.17 |
| 7 | 160 | 0.14 | 1.26 |

EXAMPLE 15

Dyes of Examples 7 and 13 have been separately incorporated in the same emulsion containing 50% silver chloride moles and 50% silver bromide moles with cubic grains having a mean grain size of 0.053μ, and which was conventionally sulphur sensitized. Dyes were incorporated at a quantity of 0.16 g of the dye per mole of silver. After a short digestion period, the emulsions have been coated on a cellulose triacetate base, dried, exposed in a sensitometer using a 500 W tungsten bulb+Kodak 88A filter at 60 cm for 100 seconds and conventionally processed in Kodak D8 developer for 2 minutes and fixed in general purpose fixer. Table 2 shows the sensitometric data expressed in Log It (Relative Sensitivity) measured at d=1.0 above fog level.

TABLE 2

| Dyes | Quantity (mg/mole Ag) | Fog | Relative Sensitivity (Log It) |
|---|---|---|---|
| 13 | 160 | 0.10 | 1.00 |
| 7 | 160 | 0.10 | 1.26 |

EXAMPLE 16

A supersensitization effect can be obtained using Leucophor or Ph₃P and derivatives thereof in conjunction with sensitizing dyes of the present invention.

Supersensitization is believed to be achieved to some degree with all the dyes of this invention. The supersensitizers are known compounds and at least $Ph_3P$ is known as a supersensitizer to "infra-chromatic" radiation.

Dye 7 was incorporated into the emulsion of Example 15 as before. The dyed emulsion was split into five parts which were treated prior to coating with a 1% solution of triphenyl phosphine in methanol as indicated in Table 3. The coatings were exposed and processed as in Example 15 and a very substantial speed increase was observed resulting from the use of triphenyl phosphine addition as recorded in Table 3.

TABLE 3

| Dyes | Ratio moles PPh₃ / moles dye | Fog | Relative Sensitivity (Log It) at D = 1.0 above fog |
|---|---|---|---|
| 7 | 0 | 0.10 | 1.26 |
| 7 | 16 | 0.10 | 1.42 |
| 7 | 32 | 0.10 | 1.66 |
| 7 | 48 | 0.12 | 1.74 |
| 7 | 64 | 0.12 | 1.86 |

EXAMPLE 17

An additional supersensitizer for the dyes of the present invention has been found in Blankophor HZP.
Leucophor BCF (Sandoz) R=OH.
Blankophor HZP (Bayer) R=NHPh.

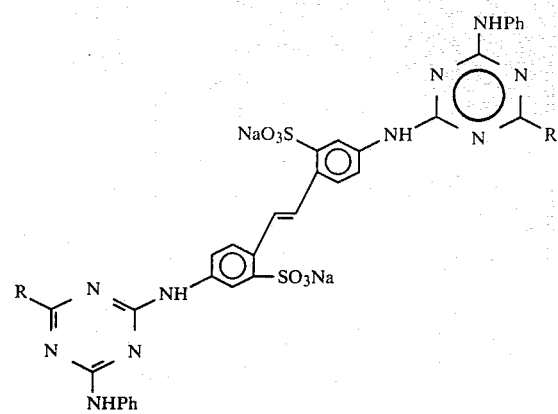

These supersensitizing agents were added to the emulsion of Example 16 as replacements for the triphenylphosphine. Similar results were obtained, although the triphenylphosphine proved to be a more effective supersensitizer.

We claim:

1. A photographic emulsion including gelatin and silver halide grains dispersed therein having grains associated with sensitizing dyes to make them sensitive to infrared rays, characterized by the sensitizing dyes being cyanine dyes including two nitrogen-containing heterocyclic nuclei linked to each other through a rigidized conjugated methine chain to form an amidinium-ion resonance system, said chain having 7, 9 or 11 carbon atoms and at least one of said nuclei is 5-methyl-6-methoxy-benzothiazole.

2. The emulsion of claim 1 in which both said nitrogen-containing heterocyclic nuclei linked through a rigidized 7, 9 or 11 methine chain are benzothiazole nuclei.

3. The emulsion of claim 2 in which said rigidized methine chain is a methine chain including 7 conjugated carbon atoms.

4. The emulsion of claim 3 in which said rigidized methine chain has substituents attached to carbon atoms in the 2 and 4 positions to form a six-carbon-atom nucleus.

5. The emulsion of claim 4 in which said rigidized methine chain has substituents in its 3 and 5 positions to form a five-carbon-atom nucleus.

6. The emulsion of claim 4 in which said heterocyclic nuclei are 5-methyl-6-methoxy-benzothiazole and substituted benzothiazole.

7. Photographic elements for exposure with infrared radiation sources including a support base and a gelatin emulsion layer including silver halide grains in sensitizing association with dyes, characterized by the fact that such emulsion is that of claim 1.

8. Photographic elements for exposure with infrared radiation sources including a support base and a gelatin emulsion layer including silver halide grains in sensitizing association with dyes, characterized by the fact that such emulsion is that of claim 2.

9. Photographic elements for exposure with infrared radiation sources including a support base and a gelatin emulsion layer including silver halide grains in sensitizing association with dyes, characterized by the fact that such emulsion is that of claim 3.

10. Photographic elements for exposure with infrared radiation sources including a support base and a gelatin emulsion layer including silver halide grains in sensitizing association with dyes, characterized by the fact that such emulsion is that of claim 4.

11. Photographic elements for exposure with infrared radiation sources including a support base and a gelatin emulsion layer including silver halide grains in sensitizing association with dyes, characterized by the fact that such emulsion is that of claim 5.

12. The photographic emulsion of claim 7 wherein the dyes represented by the formulae

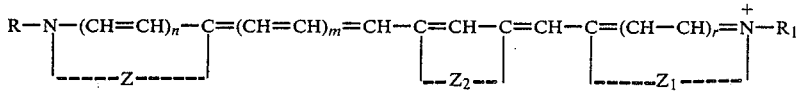
[I]

wherein:
R and $R_1$ can be a substituted alkyl group or a non-substituted alkyl having from 1 to 8 carbon atoms; $X^-$ is any acid anion; Z and $Z_1$ are independently the non-metallic atoms necessary to complete an aromatic heterocyclic nucleus chosen within the group of those known in the art to make sensitizing dyes including an amidinium-ion resonance system, with the proviso that at least one of the formed nuclei is a 5-methyl-6-methoxybenzothiazole nucleus; $Z_2$ are the atoms necessary to complete a six-carbon nucleus; m is 1, 2 or 3 and n or r are each 0 or 1; and

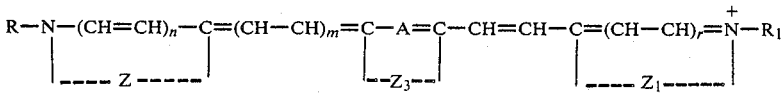
[II]

wherein:
R, $R_1$, m, n, r, Z and $Z_1$ have the same meaning as before; A is a carbon atom substituted with a disubstituted N atom,

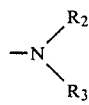

such substituents ($R_2$ and $R_3$) each being a substituted alkyl group or non-substituted alkyl having from 1 to 12 carbon atoms; an alkoxycarbamyl alkyl group including no more than 12 carbon atoms; an aryl group such as substituted phenyl group and non-substituted phenyl; and $Z_3$ means the carbon atoms necessary to form a 5-carbon rigidized nucleus represented by the following formula:

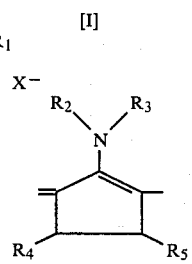
[III]

wherein the respective meanings of $R_2$, $R_3$, $R_4$ and $R_5$ have been given above.

13. Photographic emulsion including gelatin and silver halide grains dispersed therein, characterized by having grains associated with sensitizing dyes of claim 12 to make them sensitive to infrared rays.

14. The photographic emulsion of claim 1 having an effective amount of a supersensitizer included therein.

15. The photographic emulsion of claim 13 having an effective amount of a supersensitizer included therein.

16. The photographic emulsion of claim 14 wherein said supersensitizer is selected from the group consisting of a triphenyl phosphine, Leucophor BCF, and Blankophor HZP.

17. The photographic emulsion of claim 15 wherein said supersensitizer is selected from the group consisting of a triphenyl phosphine, Leucophor BCF, and Blankophor HZP.

* * * * *